(12) United States Patent
Pfister et al.

(10) Patent No.: US 11,113,114 B2
(45) Date of Patent: Sep. 7, 2021

(54) DISTRIBUTED OBJECT PLACEMENT, REPLICATION, AND RETRIEVAL FOR CLOUD-SCALE STORAGE AND DATA DELIVERY

(71) Applicant: Cisco Technology, Inc., San Jose, CA (US)

(72) Inventors: Pierre Pfister, Angers (FR); William Mark Townsley, Paris (FR); Marcel Paul Sosthène Enguehard, Paris (FR); Guillaume Ruty, Paris (FR); Yoann Desmouceaux, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 16/379,620

(22) Filed: Apr. 9, 2019

(65) Prior Publication Data
US 2020/0326981 A1  Oct. 15, 2020

(51) Int. Cl.
*G06F 9/50* (2006.01)
*G06F 9/455* (2018.01)
*H04L 9/06* (2006.01)

(52) U.S. Cl.
CPC .......... *G06F 9/505* (2013.01); *G06F 9/45558* (2013.01); *G06F 9/5083* (2013.01); *H04L 9/0643* (2013.01); *G06F 2009/45583* (2013.01)

(58) Field of Classification Search
CPC ...... G06F 9/45558; G06F 9/5088; G06F 9/50; G06F 9/505; H04L 9/0643
See application file for complete search history.

(56) References Cited

U.S. PATENT DOCUMENTS

2002/0133537 A1* 9/2002 Lau ..................... H04L 67/1023
709/203
2002/0198961 A1* 12/2002 Krishnamurthy ....... H04L 29/06
709/217

(Continued)

FOREIGN PATENT DOCUMENTS

EP       1474751 A2   11/2004
EP       3355553 A1    8/2018

OTHER PUBLICATIONS

International Search Report and Written Opinion from the International Searching Authority, dated Jul. 13, 2020, 12 pages, for corresponding International Patent Application No. PCT/US2020/026901.

*Primary Examiner* — Tuan C Dao
(74) *Attorney, Agent, or Firm* — Polsinelli

(57) ABSTRACT

Systems, methods, and computer-readable media are provided for load balancing requests and controlling object replication based on object popularity. A request for an object can be received at a dispatcher of a storage system from a client. Candidate storage nodes of the storage system for serving the object can be identified by the dispatcher by generating an ordered list of the candidate storage nodes using a two-dimensional consistent hashing function. Distribution of the request for the object through one or more candidate storage nodes for filling the request for the object can be facilitated according to the ordered list of candidate storage nodes. Specifically, the one or more candidate storage nodes can be configured to facilitate distribution of the request by selectively filling the request to the client using cache admission policies formed based on popularity characteristics of requested objects at the one or more candidate storage nodes.

20 Claims, 10 Drawing Sheets

(56) References Cited

U.S. PATENT DOCUMENTS

| | | | |
|---|---|---|---|
| 2008/0219281 A1* | 9/2008 | Akin | H04M 11/062 |
| | | | 370/419 |
| 2009/0006593 A1* | 1/2009 | Cortes | H04L 12/66 |
| | | | 709/223 |
| 2009/0060201 A1* | 3/2009 | Rhodes | H04L 63/10 |
| | | | 380/279 |
| 2009/0063588 A1* | 3/2009 | Surtani | G06F 11/2043 |
| 2010/0179954 A1* | 7/2010 | Chen | H04L 9/14 |
| | | | 707/747 |
| 2012/0226889 A1* | 9/2012 | Merriman | G06F 16/2264 |
| | | | 711/216 |
| 2013/0283287 A1 | 10/2013 | Lyle et al. | |
| 2015/0052242 A1* | 2/2015 | Itou | G06F 11/3065 |
| | | | 709/224 |

* cited by examiner

DISTRIBUTED OBJECT PLACEMENT, REPLICATION, AND RETRIEVAL FOR CLOUD-SCALE STORAGE AND DATA DELIVERY

TECHNICAL FIELD

The present technology pertains to jointly controlling object replication at storage nodes and load-balancing between the replicated objects based on object popularity, and in particular to controlling object replication at storage nodes in a distributed manner and on a per-node basis according to popularity of objects at the nodes.

BACKGROUND

Object placement strategies in storage systems, e.g. systems implementing content delivery networks (CDNs), can affect performance in storage systems, e.g. for serving objects to clients. Specifically, an object placement strategy should efficiently use storage resources, compute resources, and network resources, while also scaling with varying demand for objects and corresponding varying object diversity within storage systems. In particular, when many clients ask for the same object, load balancing is performed to control access to the object. This load balancing can introduce latency in serving the object to clients. One way to decrease latency introduced by load balancing client access to an object is to replicate the object across storage nodes. Specifically, object replication can facilitate access to the object while decreasing the need to perform load balancing and the corresponding latency associated with performing the load balancing. However, object replication across storage nodes utilizes increased amounts of storage and computational resources within storage systems, thereby limiting storage of other objects across the storage nodes. Accordingly, trade-offs exist between object locality, leading to load balancing for object access and increased latency, and object replication, leading to increased storage and compute resource usage. There therefore exist needs for systems and methods for controlling object replication, and subsequently object access load balancing, through an object placement strategy that balances the trade-offs between object locality and object replication.

Most existing storage systems, e.g. tiered CDNs, use simplified heuristics to control object replication across storage nodes, which can lead to inefficiencies in providing object access. For example, a typically tiered CDN implements an object placement strategy including a first tier of storage nodes that reach CPU and network limits, e.g. network latency limits, and a second tier of storage nodes that reach storage limitations. Controlling object replication through popularity can provide a solution to this problem observed in typical tiered CDN implementations. Specifically, an object placement strategy that relies on object popularity can be used to control object replication in storage systems while balancing the trade-offs between object locality and object replication.

However, using popularity to control object replication is difficult to implement for a number of reasons. In particular, it is hard to accurately measure object popularity to control object replications for a number of reasons. Specifically, popularity of an object can change over time. In turn, this can skew popularity measurements over time and at specific time instances, when the popularity measurement is made based on past popularity measurements. Additionally, object state, e.g. object name, statistics and lookup data-structures, can be used to accurately measure object popularity, e.g. for identifying instances of the object for measuring popularity. Given the extremely large number of objects in storage systems, and corresponding hashing-table space consumption, this state can reach tens of GBs of data that has to be stored, potentially at a significant cost and detriment to performance. Further, popularity distribution is long-tail, which means nodes don't really care about the popularity of most objects, as most objects are not popular and therefore not often requested. However, in order to know if an object is actually popular, e.g. with respect to other objects, the popularity and object states should be measured and maintained for all objects, including unpopular objects, thereby necessitating further resource usage. Additionally, accurately measuring popularity in a centralized server has many disadvantages. Specifically, redundancy is needed in order to provide high availability. Further, communications with a central server adds latency and computational overhead. Additionally, popularity can depend on object locality making it difficult to accurately measure popularity in a centralized server. There therefore exist needs for systems and methods for accurately measuring popularity of objects to control replication of the objects at storage nodes. In particular, there exist needs for systems and methods for controlling object replication and corresponding access load balancing in storage nodes in a distributed manner and on a per-node basis according to popularity of objects at the nodes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
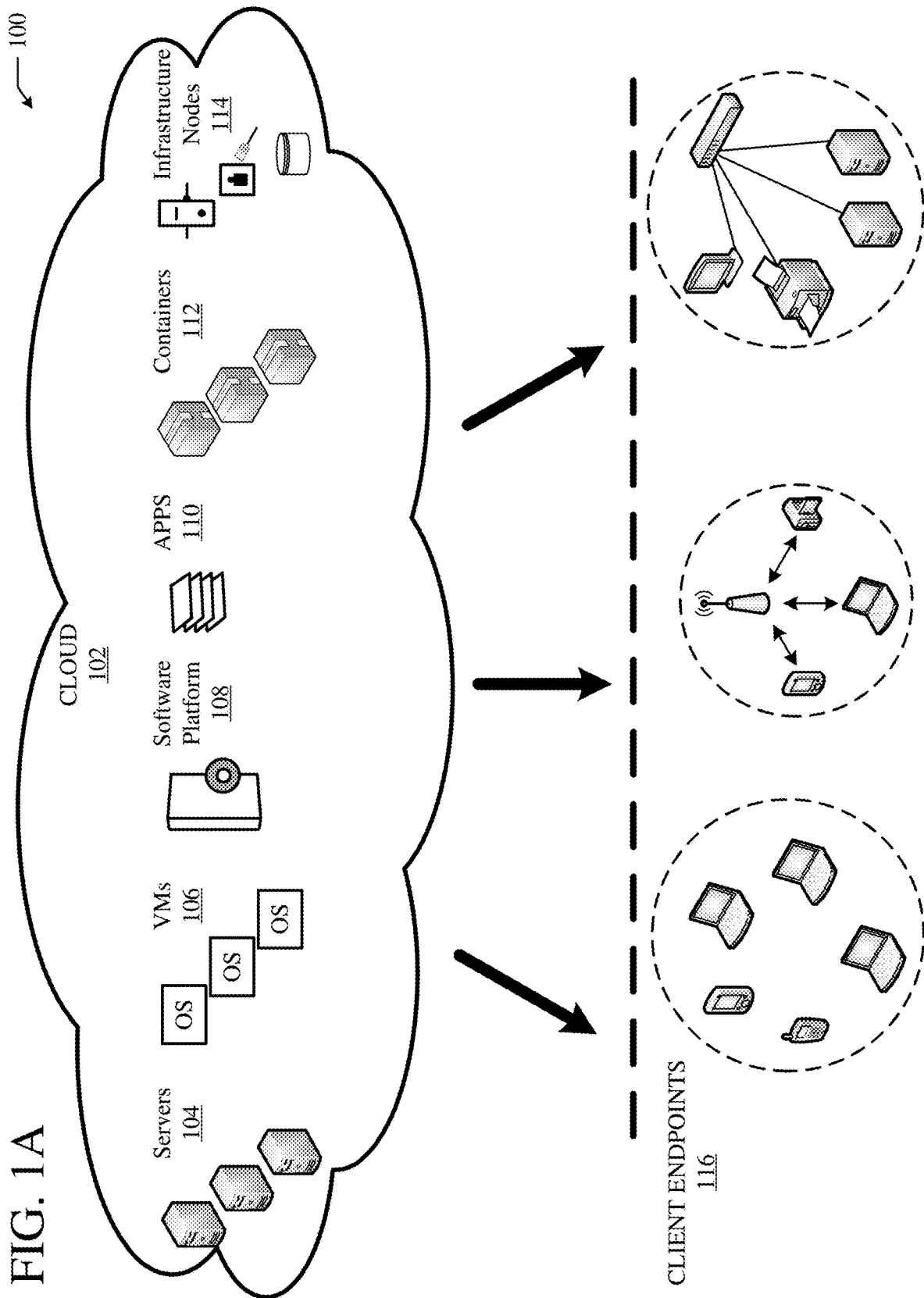
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving, at a dispatcher of a storage system, a request for an object from a client. The method can also include identifying, by the dispatcher of the storage system, candidate storage nodes of the storage system for serving the object to the client by generating an ordered list of the candidate storage nodes using a two-dimensional consistent hashing function. Distribution of the request for the object through one or more candidate storage nodes of the candidate storage nodes for filling the request for the object can be facilitated according to the ordered list of candidate storage nodes. Specifically, the one or more candidate storage nodes can be configured to facilitate distribution of the request by selectively filling the request for the object to the client using cache admission policies formed based on popularity characteristics of requested objects at the one or more candidate storage nodes.

A system can include one or more processors and at least one computer-readable storage medium storing instructions which, when executed by the one or more processors, cause the one or more processors to receive, at a dispatcher of a storage system, a request for an object from a client. The instructions can also cause the one or more processors to identify, by the dispatcher, candidate storage nodes of the storage system for serving the object to the client by generating an ordered list of the candidate storage nodes. Specifically, the instructions can cause the one or more processors to generate the ordered list of the candidate storage nodes using a two-dimensional consistent hashing function that depends on both a flow associated with the request for the object and the object itself. Further, the instructions can cause the one or more processors to facilitate distribution of the request for the object through one or more candidate storage nodes of the candidate storage nodes according to the ordered list of the candidate storage nodes for filling the request for the object. Specifically, the one or more candidate storage nodes can be configured to facilitate the distribution of the request for the object by selectively filling the request for the object to the client using cache admission policies formed based on popularity characteristics of requested objects at the one or more candidate storage nodes.

A non-transitory computer-readable storage medium having stored therein instructions which, when executed by a processor, cause the processor to receive, at a dispatcher of a storage system, a request for an object from a client. The instructions can cause the processor to identify, by the dispatcher, candidate storage nodes of the storage system for serving the object to the client by generating an ordered list of the candidate storage nodes. Specifically, the instructions can cause the processor to generate the ordered list of the candidate storage nodes using a two-dimensional consistent hashing function. Further, the instructions can cause the processor to facilitate distribution of the request for the object through one or more candidate storage nodes of the candidate storage nodes according to the ordered list of the candidate storage nodes for filling the request for the object. Specifically, the dispatcher can facilitate the distribution of the request for the object by transmitting the request for the object to a first candidate storage in the ordered list of the candidate storage nodes. Further, the one or more candidate storage nodes can facilitate the distribution of the request for the object by selectively filling the request for the object to the client using cache admission policies formed based on popularity characteristics of requested objects at the one or more candidate storage nodes.

Example Embodiments

The disclosed technology addresses the need in the art for controlling object access load-balancing, and corresponding object replication, through a request-driven object placement strategy that balances the trade-offs between object locality and object replication. The present technology involves system, methods, and computer-readable media for controlling object replication at storage nodes based on object popularity. Additionally, the present technology involves systems, methods, and computer-readable media for controlling object replication at storage nodes in a distributed manner and on a per-node basis according to popularity of objects at the nodes.

Figure 7:
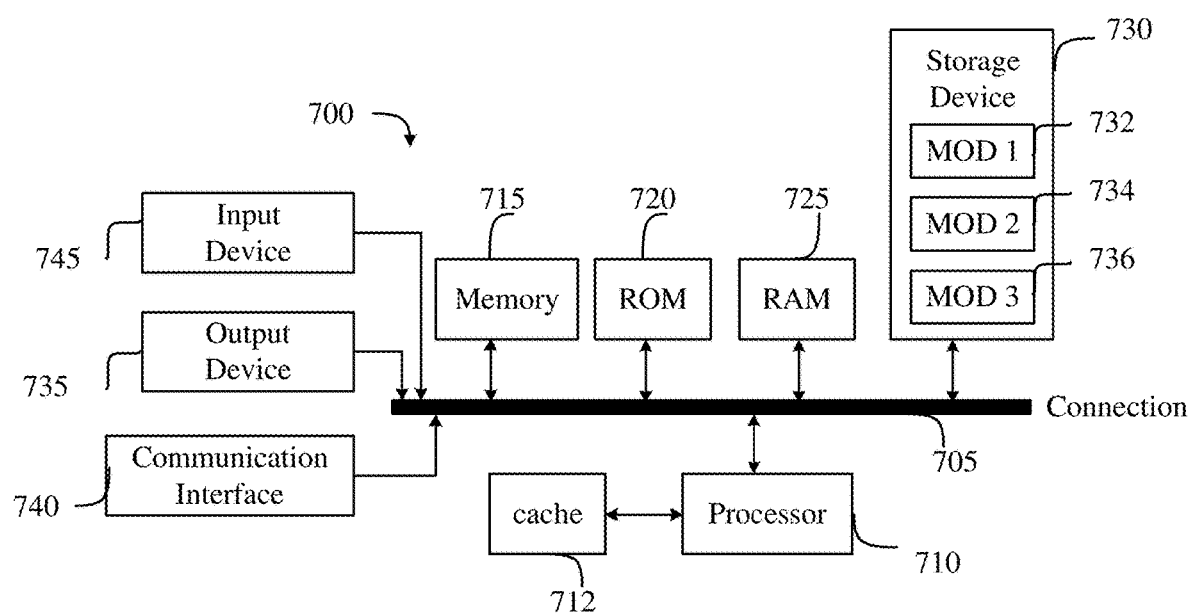
FIG. 7 illustrates an example computing system.
Figure 8:
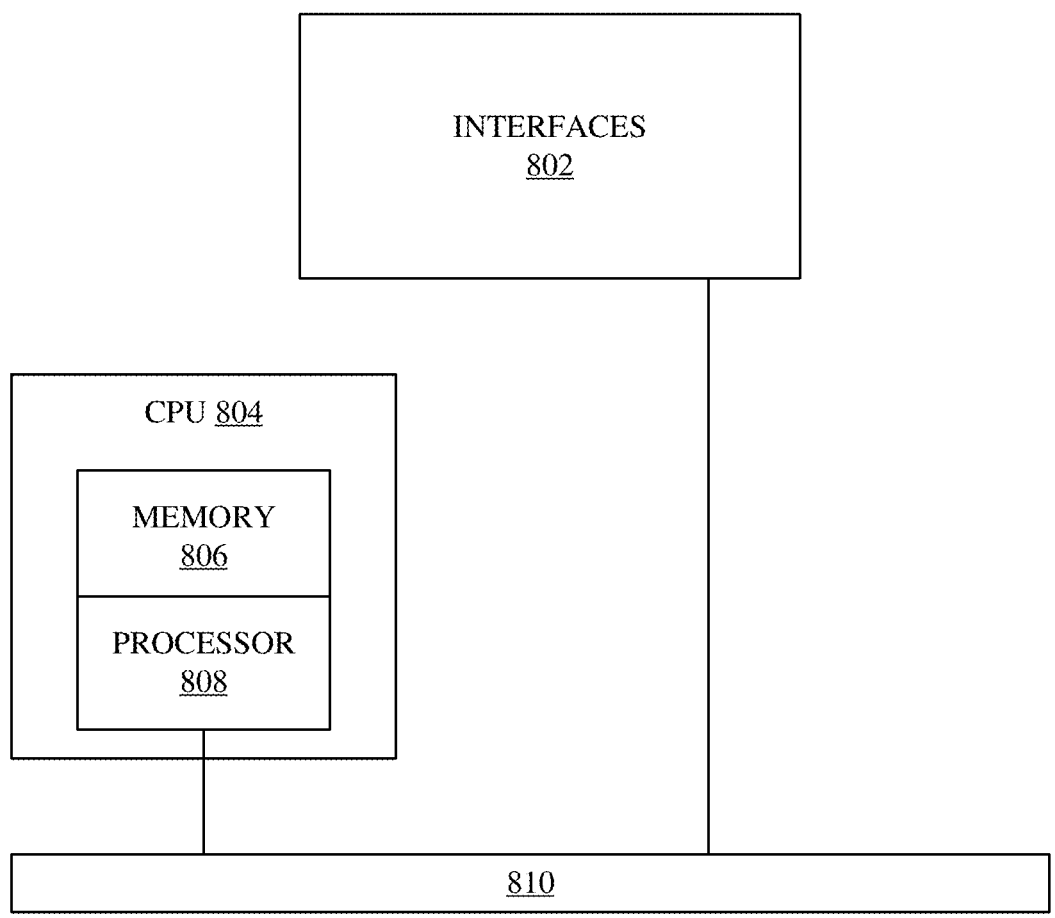
FIG. 8 illustrates an example network device.

A description of network environments and architectures for network data access and services, as illustrated in FIGS. 1A, 1B, 2A, 2B is first disclosed herein. A discussion of systems, methods, and computer-readable media for controlling object replication at storage nodes in a distributed manner and on a per-node basis according to popularity of objects at the nodes, as shown in FIGS. 3-6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
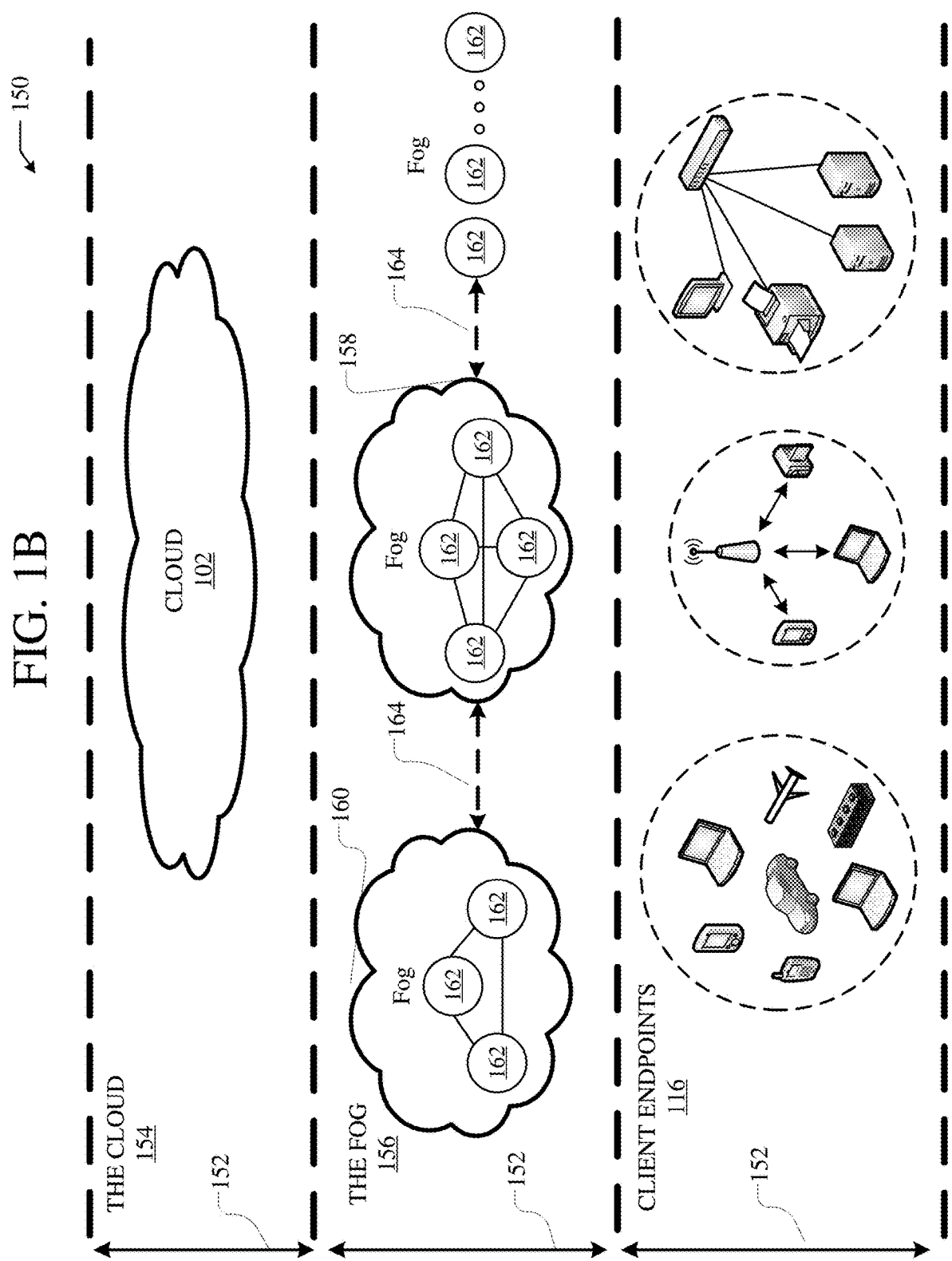
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
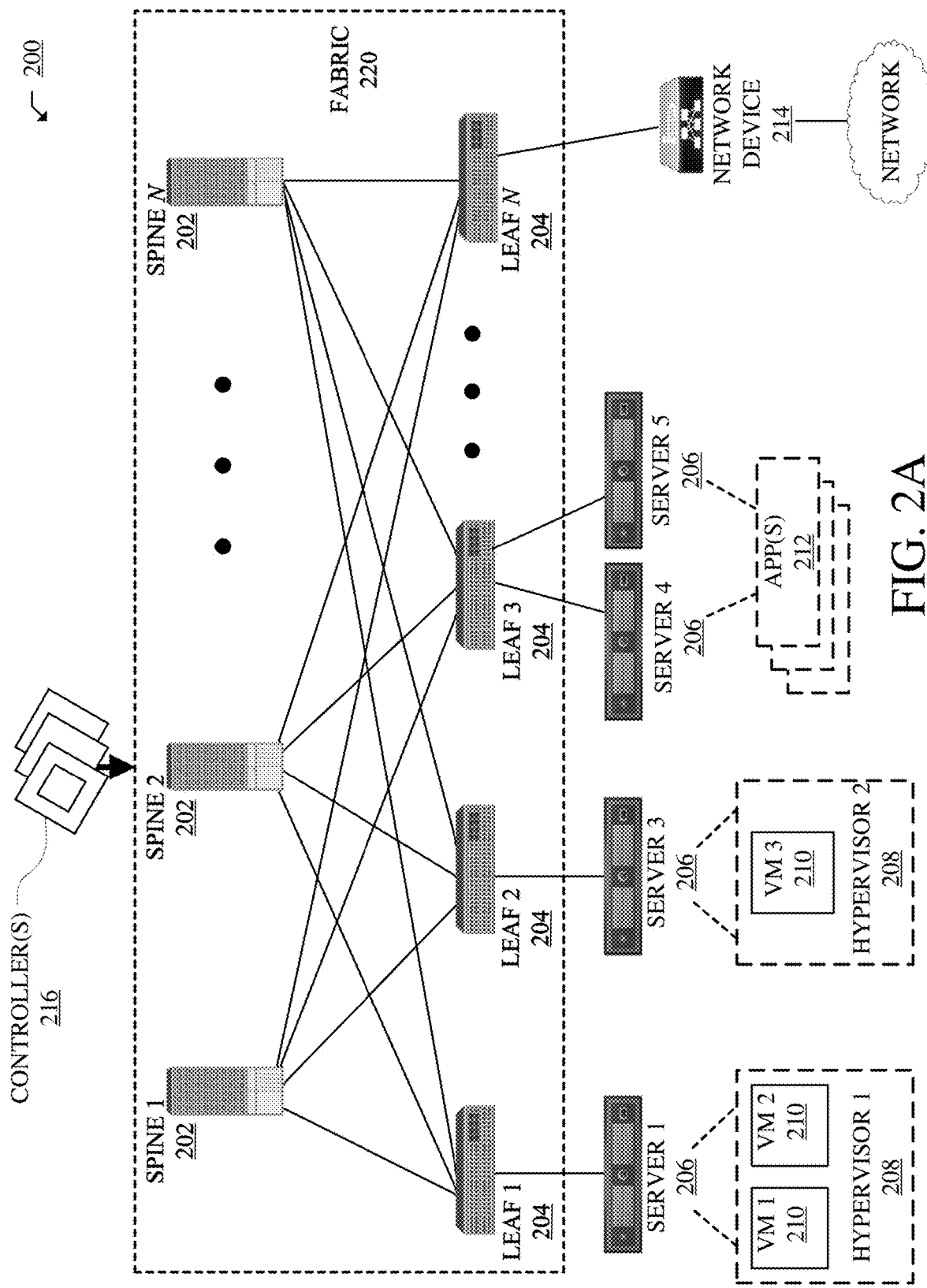
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
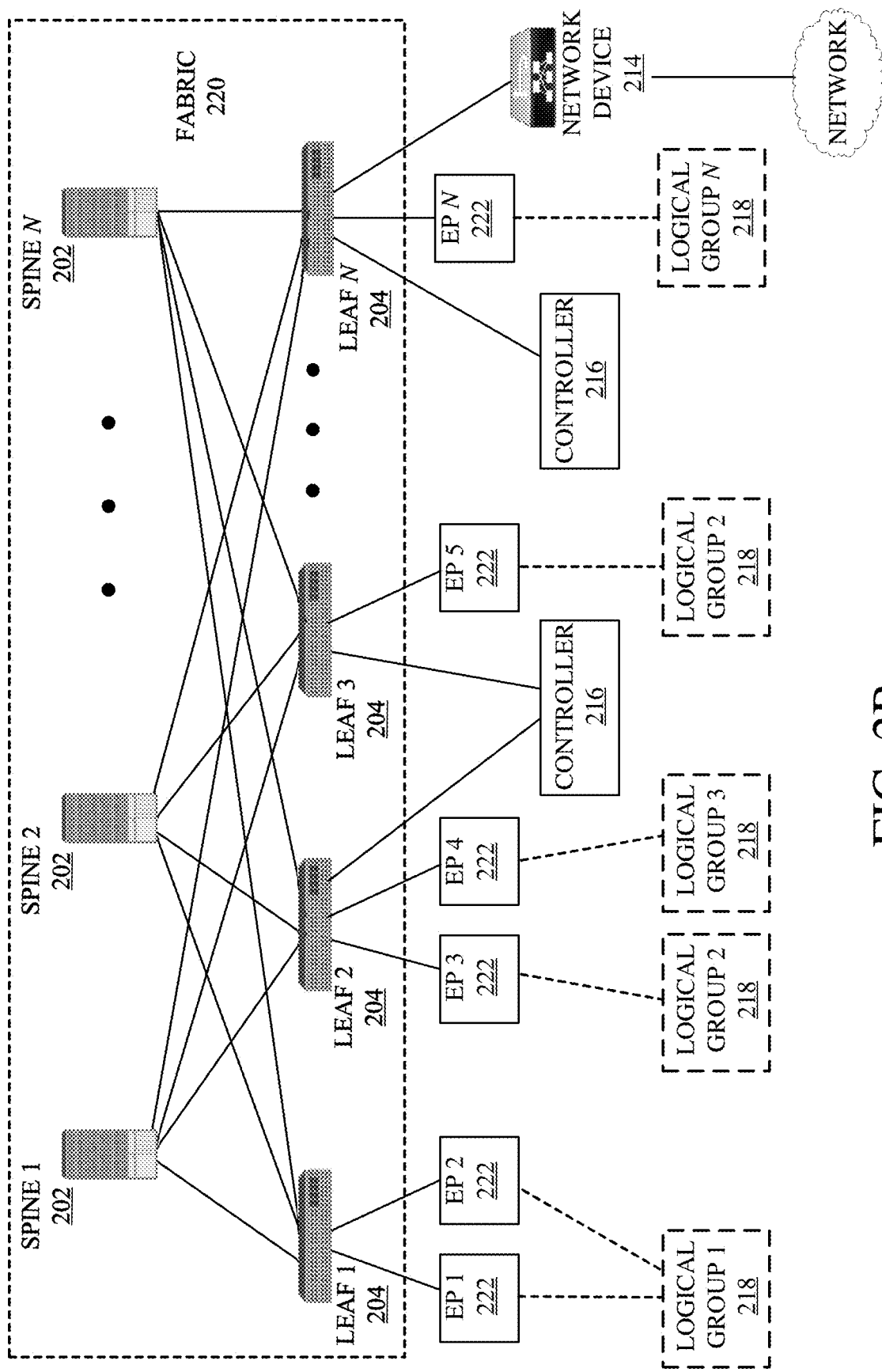
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

As discussed previously, object placement strategies in storage systems, e.g. systems implementing CDNs, can affect performance in storage systems, e.g. for serving objects to clients. Specifically, an object placement strategy should efficiently use storage resources, compute resources, and network resources, while also scaling with varying demand for objects and corresponding varying object diversity within storage systems. In particular, when many clients ask for the same object, load balancing is performed to control access to the object. This load balancing can introduce latency in serving the object to clients. One way to decrease latency introduced by load balancing client access to an object is to replicate the object across storage nodes. Specifically, object replication can facilitate access to the object while decreasing the corresponding latency associated with performing the load balancing, e.g. created as a result of load-balancing. However, object replication across storage nodes utilizes increased amounts of storage and computational resources within storage systems, thereby limiting storage of other objects across the storage nodes. Accordingly, trade-offs exist between object locality, leading to load balancing for object access and increased latency, and object replication, leading to increased storage and compute resource usage.

Most existing storage systems, e.g. tiered CDNs, use simplified heuristics to control object replication across storage nodes, which can lead to inefficiencies in providing object access. For example, a typically tiered CDN implements an object placement strategy including a first tier of storage nodes that reach CPU and network limits, e.g. network latency limits, and a second tier of storage nodes that reach space limitations. Controlling object replication through popularity can provide a solution to this problem observed in typical tiered CDN implementations. Specifically, an object placement strategy that relies on object popularity can be used to control object replication in storage systems while balancing the trade-offs between object locality and object replication.

However, using popularity to control object replication is difficult to implement for a number of reasons. In particular, it is hard to accurately measure object popularity to control object replications for a number of reasons. Specifically, popularity of an object can change over time. In turn, this can skew popularity measurements over time and at specific time instances, when the popularity measurement is made based on past popularity measurements. Additionally, object state, e.g. object name, statistics and lookup data-structures, can be used to accurately measure object popularity, e.g. for identifying instances of the object for measuring popularity. Given the extremely large number of objects in storage systems, and corresponding hashing-table space consumption, this state can reach tens of GBs of data that has to be stored, potentially at a significant cost and detriment to performance. Further, popularity distribution is long-tail, which means nodes don't really care about the popularity of most objects, as most objects are not popular and therefore not often requested. However, in order to know if an object is actually popular, e.g. with respect to other objects, the popularity and object states should be measured and maintained for all objects, including unpopular objects, thereby necessitating further resource usage. Additionally, accurately measuring popularity in a centralized server has many disadvantages. Specifically, redundancy is needed in order to provide high availability. Further, communications with a central server adds latency and computational overhead. Additionally, popularity can depend on object locality making it difficult to accurately measure popularity in a centralized server.

The present includes systems, methods, and computer-readable media for controlling object replication based on object popularity. Specifically, a dispatcher of a storage system can receive a request for an object from a client. The dispatcher can identify candidate storage nodes of the storage system for serving the object to the client by generating an ordered list of the candidate storage nodes using a two-dimensional consistent hashing function. The two-dimensional consistent hashing function can depend on both a flow associated with the request for the object and the object itself. As follows, distribution of the request for the object through one or more candidate storage nodes of the candidate storage nodes can be facilitated according to the ordered list of the candidate storage nodes for filing the request for the object. Specifically, the dispatcher can transmit the request for the object to a first candidate storage node in the ordered list of the candidate storage nodes to facilitate the distribution of the request for the object. Further, the one or more candidate storage nodes can facilitate the distribution of the request for the object by selectively filling the request for the object to the client using cache admission policies formed based on popularity characteristics of requested objects at the one or more candidate storage nodes.

Figure 3:
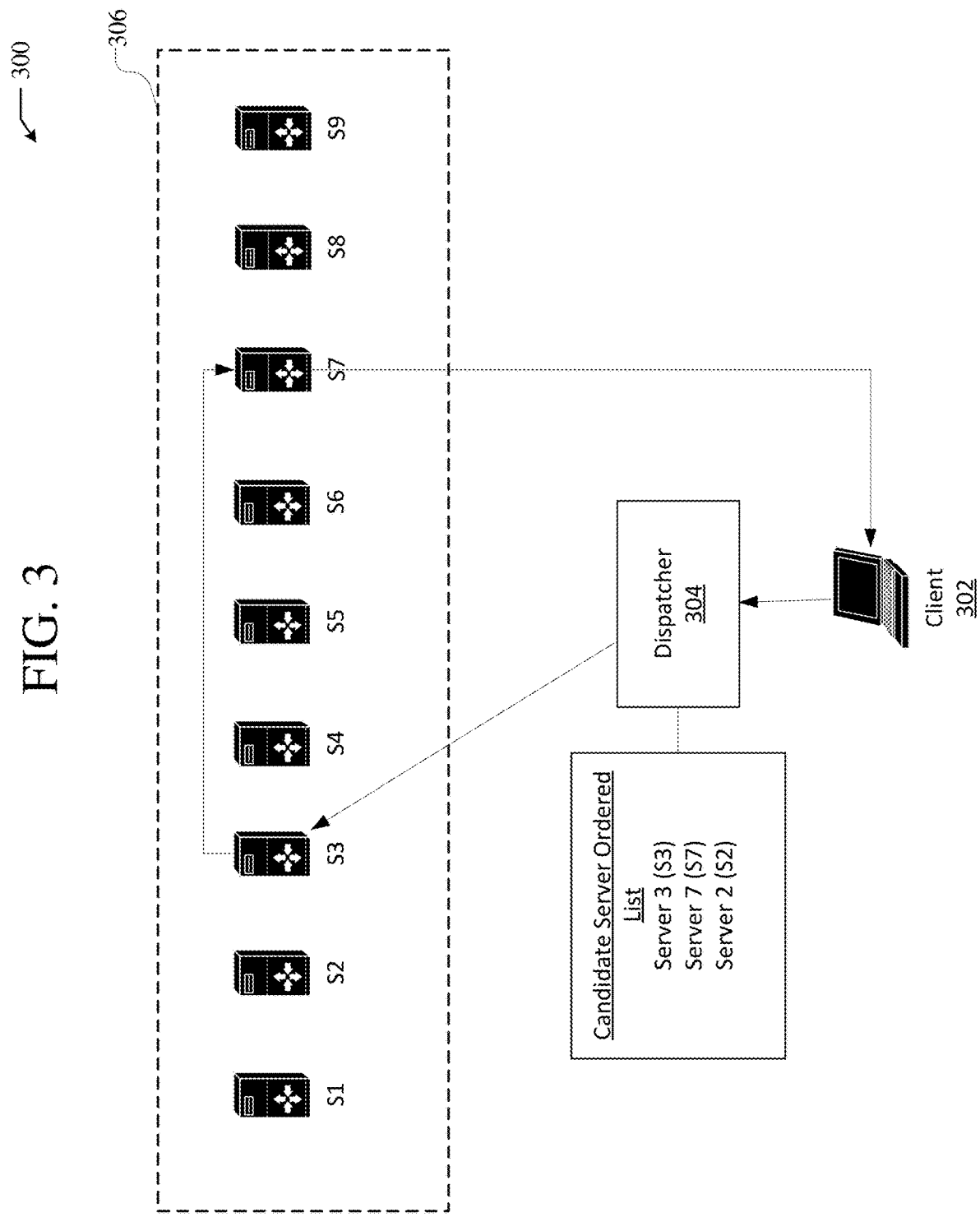
FIG. 3 shows an example environment for controlling object replication in a storage system based on popularity of requested objects.

FIG. 3 shows an example environment 300 for controlling object replication in a storage system based on popularity of requested objects. Specifically, the example environment 300 shown in FIG. 3 can be used to control object replication at storage nodes in a storage system in a distributed manner across the storage nodes. More specifically, the example environment 300 shown in FIG. 3 can be used to control object replication at storage nodes in a storage system on a per-node basis according to object popularity at each of the storage nodes. In controlling object replication based on popularity, the environment 300 can effectively control load balancing of access to the object across storage nodes of a storage system. For example, by replicating the object based on popularity across storage nodes, the environment 300 can be used to control how many times the object appears in a storage system, and thereby regulate an amount of load balancing used in providing access to the object in the storage system.

The example environment 300 shown in FIG. 3 can be formed, at least in part, through an applicable cloud or fog environment, such as the cloud computing architecture 100 shown in FIG. 1A and the fog computing architecture 150 shown in FIG. 1B. For example, the environment 300 can be implemented as part of a CDN implemented in the cloud computing architecture 100. Further in the example, the environment 300 can be used to control object replication at storage nodes in the CDN implemented in the cloud computing architecture 100. Further, the environment 300 can be formed, at least in part, through an applicable network environment, such as the network environment 200 shown in FIGS. 2A and 2B. For example, the environment 300 can be implemented, at least in part, in a data center formed by the network environment 200 shown in FIG. 2A. Further in the example, the environment 300 can be used to control object replication at storage nodes in the data center formed by the network environment 200.

The example environment 300 shown in FIG. 3 includes a client 302, a dispatcher 304, and a server pool 306. The client 302 functions to request access for an object and subsequently gain access to the object through the environment 300. A client, as used herein, can include an applicable entity capable of requesting and gaining access to an object. Specifically, a client can include a user, a network service, and an application. For example, a client can include a microservice of a structured application that is configured to request and gain access to an object in executing the structured application.

The dispatcher 304 functions to receive a request for an object from the client 302. The dispatcher 304 can be implemented as part of the client 302. For example, the dispatcher 304 can be implemented through an application executing at the client 302. Alternatively the dispatcher 304 can be implemented remote from the client 302 and receive the request for the object through a network. For example, the dispatcher 304 can be implemented in the cloud computing architecture 100 remote from the client 302. Accordingly, the dispatcher 304 can receive the request for the object in the cloud computing architecture 100 through a network.

The request for the object received from the client 302 includes an identifier of the requested object. As will be discussed in greater detail later, the object identifier can be used to select candidate servers for providing the object to the client 302. Further, the request for the object can be included as part of, or otherwise associated, with a data flow for sending data to and receiving data from the client 302. A flow including the request for the object can be associated with a network service that is provisioned to the client 302. For example, a flow can be associated with streaming television content to the client 302, and the request for the object can include a request for a portion of the television content. As will be discussed in greater detail later, a flow of the requested object can be used to select candidate servers for providing the object to the client 302.

The dispatcher 304 is included as part of, or otherwise associated with, a storage system. The storage system can be an applicable storage system for storing and serving objects. For example, the storage system can be a CDN. The storage system of the dispatcher 304 includes the server pool 306. The server pool 306 includes servers S1 . . . S9. While reference is made to servers throughout this description, a server is meant to represent an applicable storage node for storing objects and providing access to the object. Specifically, the servers can represent storage nodes in a datacenter. Additionally, while only nine servers are shown in the server pool 306, in various embodiments, the server pool 306 can include more servers or fewer servers.

Using the received request for the object, the dispatcher 304 can identify candidate servers of the server pool 306 for providing the object to the client 302. A candidate server can include a server that has the requested object stored locally. In turn, the candidate server can provide the object to the client 302 from its local storage, e.g. cache. Alternatively, a candidate server can include a server that does not have the requested object stored locally. Subsequently and as will be discussed in greater detail later, the candidate server can determine whether to retrieve the requested object from another location or forward the request to another candidate server. As will be discussed in greater detail later, the candidate server can retrieve the requested object and store the object in local storage at the candidate server. In particular and as will be discussed in greater detail later, the candidate server can use popularity metrics, e.g. popularity characteristics of requested objects at the candidate server, to determine whether to retrieve the requested object from another location. Subsequently, the candidate server can store the requested object locally and provide the object to the client 302 from its local storage.

The dispatcher 304 can identify the candidate servers of the server pool 306 by generating an ordered list of the candidate servers. An ordered list of the candidate servers includes a sequential list of candidate servers through which the object request can be distributed in order to provide the object to the client 302. Specifically, the request for the object can be distributed through the server pool 306 according to the ordered list of candidate servers for purposes of ultimately providing the requested object to the client 302. As will be discussed in greater detail later, the dispatcher 304 can transmit the object request to a first candidate server in the ordered list of candidate servers. Subsequently and as will be discussed in greater detail later the candidate servers can then sequentially distribute the object request through the candidate servers in the pool of candidate servers based on the ordered list of candidate servers. Specifically, the candidate servers can distribute the object request based on whether the candidate servers agree to provide the object to the client 302. Alternatively, the dispatcher 304 can query each of the candidate severs in a distributed fashion to fill the object request. In turn, the object can be replicated based, at least in part, on whether the candidate servers agree to provide the object to the client 302, effectively controlling replication of the object in the server pool 306.

The dispatcher 304 can generate the ordered list of candidate servers using a two-dimensional consistent hashing function. Example, hashing functions that can be used by the dispatcher 304 to generate the ordered list of candidate servers will be discussed in greater detail later. Consistent hashing, as used herein, refers to a technique for distributing flows, e.g. requests for objects corresponding to flows, according to their hashes. In particular, consistent hashing can be used to distribute request for objects/flows, such that the distribution is robust to server-set changes.

As will be discussed in greater detail later with respect to example hashing functions, the dispatcher 304 can use a two-dimensional consistent hashing function that is dependent on both the flow associated with the requested object and the object identifier of the requested object to generate the ordered list of candidate servers. Specifically, the dispatcher 304 can use flow information of the flow associated with the requested object to apply the two-dimensional consistent hashing function to generate the ordered list of candidate servers. Flow information can include applicable data related to a flow of a requested object. For example, flow information of the requested object can include a 5-tuple of the flow and a client identifier of the client 302.

The dispatcher 304 can apply the two-dimensional consistent hashing function based on varying server diversity to generate the ordered list of candidate servers. Server diversity can be defined as a number of candidate servers for serving the object. Server diversity can depend on both an amount of load-balancing within the storage system and an amount of object locality, e.g. the probability of a storage node having a given object in the storage system. For example, the dispatcher 304 can select one or more candidate servers using a larger server diversity that weighs load-balancing more than object locality within the storage system, e.g., privileging load balancing over reducing object replication. In another example, the dispatcher 304 can select one or more candidate servers using a smaller server diversity that weighs object locality more than load-balancing within the storage system, e.g., achieving lower object replication at the cost of decreased repartition of the ingress load. Accordingly, applying the two-dimensional consistent hashing function with increasing server diversity can increase the number of identified candidate servers as increasing server diversity favors more load-balancing. This concept will be described in further detail later with respect to FIG. 4.

Further, as object locality corresponds to the object itself, and load-balancing corresponds to the flow of the object, varying server diversity can cause the hashing function to vary weighing of the object and the flow of the object in application. For example, the dispatcher 304 can apply the hashing function with a larger server diversity that favors load-balancing. Subsequently, the hashing function can depend more on the flow of the object rather than the object itself in selecting one or more candidate servers. In another example, the dispatcher 304 can apply the hashing function with a smaller sever diversity that favors object locality. Subsequently, the hashing function can depend more on the object itself rather than the flow of the object in selecting one or more candidate server.

Figure 4:
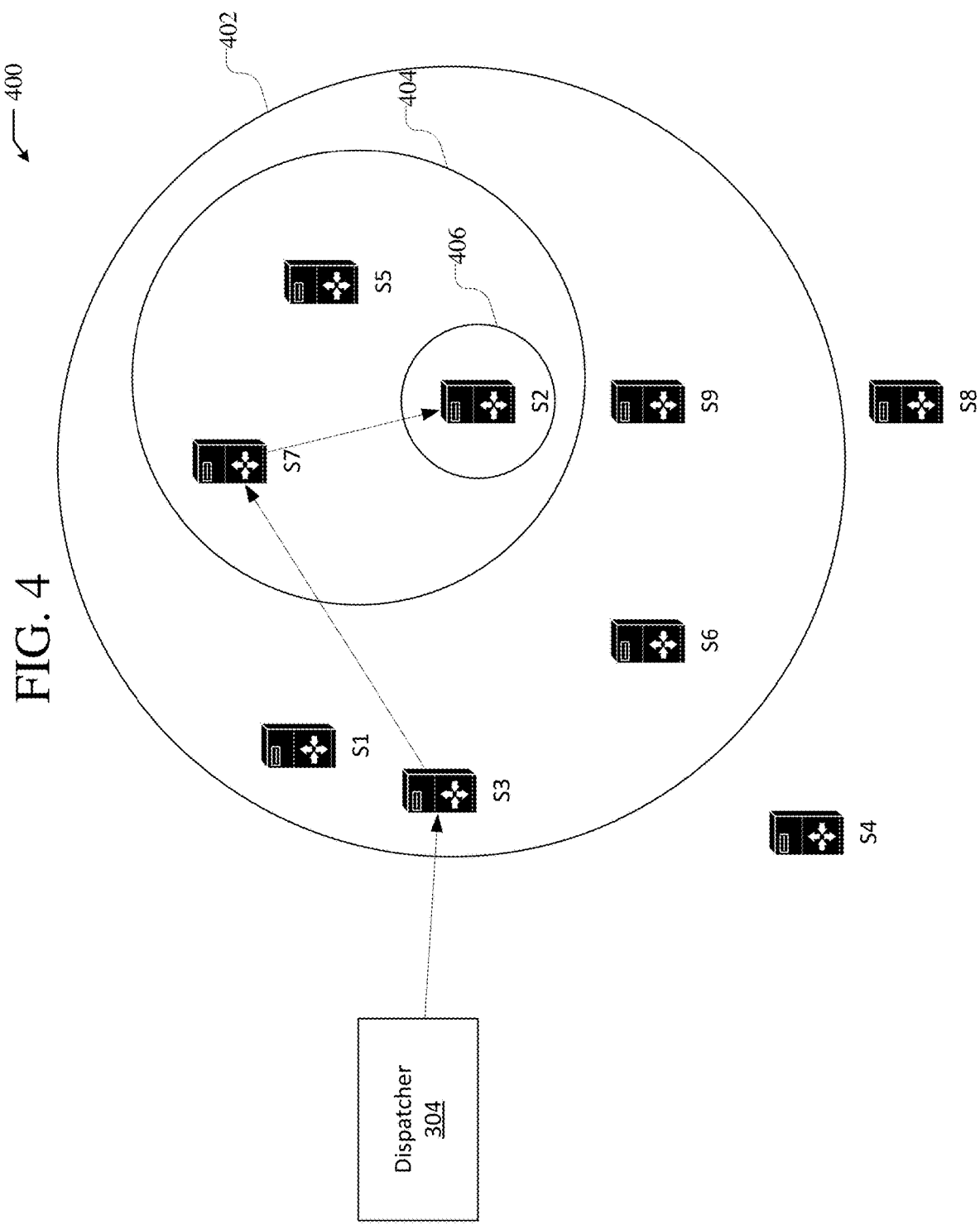
FIG. 4 shows a scenario of the dispatcher for generating the ordered list of candidate servers using varying server diversity.

FIG. 4 shows a scenario 400 of the dispatcher 304 for generating the ordered list of candidate servers using varying server diversity. In the example scenario 400 shown in FIG. 4, the dispatcher 304 can use an applicable hashing function, such as the hashing functions described herein, to generate the ordered list of candidate servers. Specifically, the dispatcher 304 can use a two-dimensional consistent hashing function with the request object identification and the flow information of the object flow to identify the ordered list of candidate servers.

Further, the dispatcher 304 can apply varying server diversity amounts in the two-dimensional consistent hashing function to different subsets of candidate servers. Specifically, the dispatcher 304 can apply ever decreasing server diversity amounts in the two-dimensional consistent hashing function to generate smaller and smaller subsets of candidate servers. Subsequently, the dispatcher 304 can randomly or pseudo-randomly select a candidate server in each subset of candidate servers to create the ordered list of candidate servers. In applying ever decreasing server diversity amounts in the two-dimensional consistent hashing function, object locality, e.g., the probability of a candidate server having the request in its storage, is favored more heavily as the size of the subsets of candidate servers decreases. In turn, the final server subset can include one more candidate servers that heavily favor locality of the object, e.g. be identified based on the identification of the object. As locality is heavily favored, the one or more candidate servers in the final subset include a local copy of the requested object. Accordingly, the identified candidate server list will include at least one candidate server, the final candidate server in the list, which has a local copy of the object. This ensures that a copy of the object is available for access by the client 302 amongst the candidate servers in the ordered list of candidate servers.

With respect to the example scenario 400 shown in FIG. 4, the dispatcher 304 can apply the hashing function with a large server diversity amount, e.g. a server diversity amount of 7, to generate a first subset of candidate servers 402. The first subset of candidate servers 402 includes the first server S1, the second server S2, the third server S3, the fifth server S5, the sixth server S6, the seventh server S7 and the ninth server S9. The fourth server S4 and the eighth server S8 are excluded from the first subset of candidate servers 402 through application of the hashing function. As load balancing is favored greater than locality in the larger server diversity amount used to create the first subset of candidate servers 402, some of the candidate servers in the first subset of candidate servers 402 might not include a locally stored copy of the object.

The dispatcher 304 can then randomly or pseudo-randomly select a server from the first subset of candidate servers 402 to function as the first candidate server in the ordered list of candidate servers. Specifically, in the example scenario 400 shown in FIG. 4, the dispatcher 304 selects the third server S3 from the first subset of candidate servers 402. As follows, the dispatcher 304 can add an identification of the third server S3 as the first candidate server in the ordered list of candidate servers.

Next, the dispatcher 304 decreases the server diversity amount and applies the hashing function to generate a second subset of candidate servers 404. Specifically, the dispatcher 304 can apply the hashing function with a decreased server diversity amount, e.g. 3, when compared to the server diversity amount of 7 used to generate the first subset of candidate servers 402. The second subset of candidate servers 404 includes the second server S2, the fifth server S5, and the seventh server S7. The dispatcher 304 can then randomly or pseudo-randomly select a server from the second subset of candidate servers 404 to function as the next candidate server in the ordered list of candidate servers. Specifically, in the example scenario 400 shown in FIG. 4, the dispatcher 304 selects the seventh server S7 from the second subset of candidate servers 404. As follows, the dispatcher 304 can add an identification of the seventh server S7 as the next candidate server in the ordered list of candidate servers.

This process of decreasing the server diversity amount used in applying the hashing function to ultimately identify a candidate server can be repeated an applicable number of times. Specifically, in the example scenario 400, the dispatcher decreases the server diversity amount and applies the hashing function generate a third subset of candidate servers 406. Specifically, the dispatcher 304 can apply the hashing function with a decreased server amount, e.g. 1, when compared to the server diversity amount of 3 used to generate the second subset of candidate servers 404. The third subset of candidate servers 406 only includes the second server S2. Accordingly, the dispatcher 304 can select the second server S2 to function as the next candidate server in the ordered list of candidate servers. As follows, the dispatcher 304 can add an identification of the second server S2 as the next candidate server in the ordered list of candidate servers. As discussed previously, since locality is favored as the server diversity is decreased, and as the second server S2 is identified from the hashing function when using the lower server diversity amount, then the second server S2 includes a local copy of the object. Specifically, the second server S2 functions as the last candidate server in the ordered list of candidate servers and also includes a local copy of the object.

The disclosure now turns to a discussion of different hashing functions that can be used by the dispatcher 304 to identify the ordered list of candidate servers.

In various embodiments, the dispatcher 304 can use a Torus 2-step hashing technique with weights to generate the ordered list of candidate servers. This hashing technique is based on 1-D circular hashing techniques. In a 1-D circular hashing, objects are associated with servers with their closest hash. In the 2-D Torus hashing technique, objects and servers are hashed into points using two different hashing functions for each coordinate. Object and servers can be hashed for each coordinate according to the 2-D Torus hashing technique using a single hashing function and salt. In turn, the dispatcher can select a candidate server that has a hash point closest to an object's hash point. Instead of using a simple distance like Euclidian sqrt($\Delta$(flow)2+$\Delta$(object-id)2) to determine distance between hash points, a weight parameter to A (flow): sqrt($\alpha$*$\Delta$ (flow)2+$\Delta$ (object-id)2) can be used. Alpha, in this case, is the server diversity. As follows, for $\alpha$=0, all requests for a given object go to the same server. When $\alpha$=infinity, objects are load-balanced between all servers. All other alpha values provide different levels of trade-offs between load-balancing and object locality corresponding to different server diversities. This technique can be generalized to N-Dimensions (with N parameters and N−1 affinity weights). Further, this technique can be generalized to other distances between servers and objects and not be implemented using the closest server and object based on hash points.

In certain embodiments, the dispatcher 304 can use a ring hashing technique to generate the ordered list of candidate servers. Specifically, the dispatcher 304 can use a ring hashing technique with consistent server subsets to generate the ordered list of candidate servers. In implementing the ring hashing technique, the dispatcher 304 can place all or a portion of servers around a circle. For example, servers can be placed pseudo-randomly around a circle, e.g. by assigning a pseudo-random angle to each server. Subsequently, the dispatcher 304 can select subsets of servers of diversity d_i by selecting the d_i closest servers to a content identifier hash, e.g. of the request object, on the circle/ring. As follows, the dispatcher 304 can use the flow information of the requested object, e.g. 5 tuple and a client id, to select the candidate server with flow-based consistent hashing. The following describes a specific implementation of the ring hashing technique. Specifically, if there are N servers, a list size of L is built, and if a_k is the server diversity parameter for the k_th server in the list, with $\alpha$_1=N>$\alpha$_2> . . . >$\alpha$_L=1, then the last server is found by: s_L=hash_L mod 2*$\pi$. The k-th (k<L) server is found by: s_k=s_L+(hash_k mod 2*$\pi$*$\alpha$_k/N). hash_L is a hash of the object-id, and hash_k (k<L) are different hash functions of the flow-id, and the mod x operator is a shift modulus which returns value between −x/2 and +x/2.

In another implementation of the ring hashing technique, the $\alpha$_i servers that are closest to the s_L servers on the ring can be identified, e.g. manually identified. The identified $\alpha$_i servers that are closest to the s_L servers can then be placed on a newly generated ring. Subsequently, s_k can be directly used to select candidate servers from the $\alpha$_i servers placed on the newly generated ring.

The ring hashing technique is advantageous when a server is removed from a subset of servers. Specifically, when a server is removed, the content/object stored at that server has to be redistributed. Further, it is desirable to redistribute the content to a server that is closest through the ring hash technique, e.g. closest on the circle to the removed server. However, there is a high probability that the closest server already has the content, thereby eliminating the need to unnecessarily replicate the content stored at the removed server.

Figure 5:
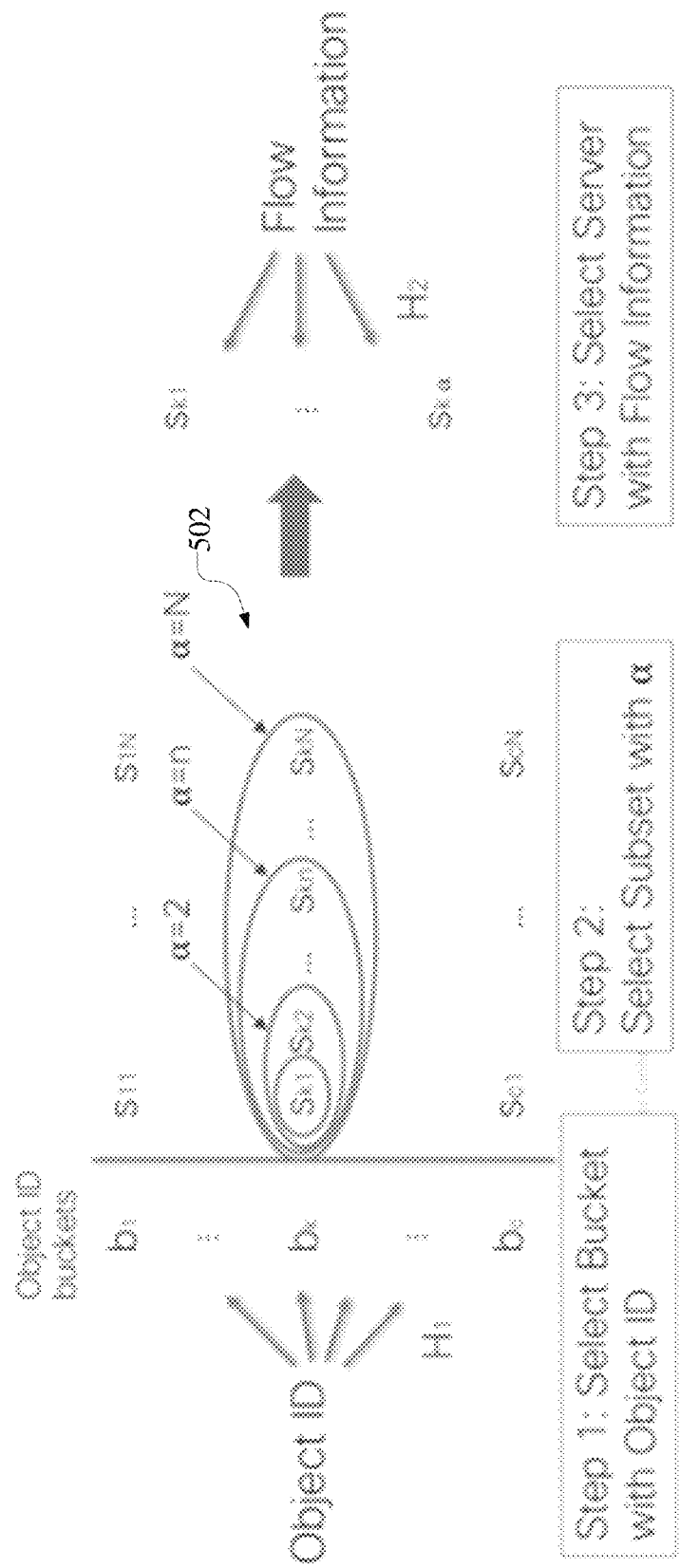
FIG. 5 shows a conceptual flow of application of the 2-step hashing technique to generate an ordered list of candidate servers.

In various embodiments, the dispatcher 304 can use a 2-step hashing technique with consistent server subsets to generate the ordered list of candidate servers. FIG. 5 shows a conceptual flow 500 of application of the 2-step hashing technique to generate an ordered list of candidate servers.

At the first step of the conceptual flow 500, a first consistent hashing technique is used to map object-IDs to server permutations 502. Such a technique can be derived from Maglev hashing since it relies on server permutations 502 to assign buckets to servers. As shown in the conceptual flow 500, instead of having a single server per bucket, a bucket can include a plurality of servers. Specifically, by the very nature of the Maglev technique, k server permutations are permutated. The variable k can be the number of buckets.

At the second step of the conceptual flow 500, the diversity parameter a is used to pick a subset of servers from the permutation. The larger the diversity, the larger the subset of servers. Further, growing subsets can include each other as the diversity parameter is increased. For example, the diversity can be a 'number of servers', going from 1 to N.

At the third step of the conceptual flow 500, a second consistent hashing technique is used to map the flow of the object, e.g. based on the flow information, into a selected subset of servers. This second consistent hashing technique can also leverage Maglev hashing. As a result, the ordered list of candidate servers can be generated based on the mapping of the flow of the objet to servers in the selected subset of servers.

Returning back to the example environment 300 shown in FIG. 3, the dispatcher 304 can facilitate distribution of the request for the object through at least a portion of the server pool 306. Specifically, the dispatcher 304 can facilitate distribution of the request through at least a portion of the server pool 306 after the dispatcher 304 identified the ordered list of candidate servers. More specifically, the dispatcher 304 can facilitate distribution of the request through at least a portion of the candidate servers using the ordered list of candidate servers. As will be discussed in greater detail later, the request for the object can be distributed through at least a portion of the server pool 306 in a sequential fashion according to the ordered list of candidate servers. The request can be distributed using an applicable data forwarding protocol. For example, the request can be distributed through HTTP-proxy, sequential HTTP requests, and network-level traffic steering using an applicable protocol, e.g. Segment Routing Local Block (SRLBO or Multiprotocol Label Switching (MPLS). In particular, the request can be forwarded using a protocol that allows for candidate servers, as will be discussed in greater detail later, to accept or reject the request based on their local cache admission algorithm.

In facilitating distribution of the request for the object through the server pool 306, the dispatcher 304 can send the request to a first candidate server in the ordered list of candidate servers. Specifically, in the example environment 300 shown in FIG. 3, the dispatcher 304 can send the request to the third server S3.

Each candidate server in the server pool 306 that receives the request for the object can facilitate distribution of the request for the object by determining whether to accept or reject the request. If a candidate server decides to accept the request, then that candidate server can provide the object to the client 302. Subsequently, the candidate server can refrain from forwarding the request to another candidate server if the candidate server accepts the request. Alternatively, if a candidate server decides to reject the request, then the request can be forwarded to another candidate server in the server pool 306. Specifically, if the candidate server devices to reject the request, then the candidate server can forward the request to a next candidate server in the ordered list of candidate servers. This process can repeat itself until a candidate server in the ordered list of candidate servers accepts the request. In various embodiments, as the last candidate server in the ordered list of candidate servers was selected with heavy weighting of object locality, the last candidate server has the object stored locally. As a result, the last candidate server can fill the request for the object, thereby ensuring that the client 302 is able to access the object.

The candidate servers in the server pool 306 can determine whether to accept the request based on popularity characteristics of requested objects at the candidate servers. In particular, the candidate servers in the server pool 306 can determine whether to accept the request for the object based on popularity characteristics of the requested object at the candidate servers. Popularity characteristics include applicable characteristics related to requesting of an object at the candidate servers. For example, popularity characteristics of requested objects can include a number of times requests for the object are received at the candidate servers, e.g. each of the candidate storage nodes, whether the requests are accepted at the candidate servers, and whether the requests are rejected at the candidate servers. The popularity characteristics can be maintained on a per-node basis and the subsequent decision whether to accept the request for the object can be performed on a per-node basis. For example, a candidate server can determine whether to accept the request for the object based on the number of times the object has been requested at the specific candidate server. Therefore, the decision whether to accept the request for the object can be performed in a distributed fashion across the servers. As will be discussed in greater detail later, replication of the object across the candidate servers in the server pool 306 can therefore by controlled in a distributed fashion across the servers.

The candidate servers in the server pool 306 can use their local cache admission policies to determine whether to accept the request for the object. A local cache admission policy can include a list of the top most request objects, e.g. at a candidate server. Further, a local cache admission policy can include an applicable policy for controlling cache access to and cache storage of a requested object based on popularity characteristics of objects, including the requested object. Specifically, the cache admission policy can include an applicable policy that allows for caching of popular objects, e.g. based on object requests, at the candidate servers while refraining from caching unpopular objects. For example, the local cache admission policy can be implemented through a least frequently used (LFU) caching technique, 2Q cache replacement policy, LRU-K page replacement technique, and a least recently/frequently used (LRFU) caching technique.

The candidate servers in the server pool 306 can maintain local cache admission policies on a per-node basis. Specifically, the candidate servers in the server pool 306 can maintain local cache admission policies based on requests for objects received at the candidate servers and potentially based on whether the candidate servers accept the requests. For example, a candidate server can receive one hundred requests for a specific object. Subsequently, the candidate server can update its local cache admission policy to allow for caching of the requested object based on receipt of the one hundred requests. In various embodiments, a candidate server in the server pool 306 can maintain a local cache admission policy based on all requests for objects received at the candidate server.

If a candidate server in the server pool 306 accepts the request for the object then it can facilitate client access to the object, e.g. provide the object to the client 302. In providing access to the object, the candidate server can determine whether the object is stored locally at the candidate server, e.g. in cache. If the candidate server determines that the object is stored locally, then the candidate server can provide the object to the client 302 from the local storage.

Alternatively, if the candidate server accepts the request for the object and determines that the object is not stored locally at the candidate server, then the candidate server can retrieve the object from a location in the storage system. Subsequently, the candidate server can copy the object into local storage at the candidate server. For example, the candidate server can retrieve the object from an applicable location, e.g. the last candidate server in the ordered list of candidate servers, and copy the object into local storage at the candidate server. In retrieving the object and copying the object into local storage at the candidate server, the candidate server can effectively replicate the object in the storage system. As the decision whether to accept the request for the object, and subsequently retrieve and copy the object, is made by the candidate server on per-node basis, object replication can be controlled in a distribute manner on a per-node basis. This can solve the previously described deficiencies of controlling object replication in storage systems in a centralized manner.

With respect to the example environment 300 shown in FIG. 3, as described previously, the third server S3 can receive the request for the object from the dispatcher 304. Specifically, as the third server S3 is the first candidate server in the ordered list of candidate servers, the third server S3 can receive the request for the object from the dispatcher 304. In turn, the third server S3 can determine to reject the request for the object. Specifically, the third server S3 can determine to reject the request for the object based on a local cache admission policy of the third server S3 that is maintained based on requests for object received at the third server S3. Subsequently, the third server S3 can forward the request for the object to the next candidate server in the ordered list of candidate servers, which is the seventh server S7.

The seventh server S7 can receive the request for the object and determine whether to accept the request. Specifically, the seventh server S7 can use a local cache admission policy to determine whether to accept the request based on popularity. In the example environment 300 shown in FIG. 3, the seventh server S7 accepts the request. Subsequently, the seventh server S7 can determine whether it has the object in local storage. If the object is already stored locally at the seventh server S7, then the seventh server S7 can provide the object to the client 302. Alternatively, if the object is absent from local storage at the seventh server S7, then the seventh server S7 can retrieve the object and copy it into local storage, effectively replicating the object. Subsequently, the seventh server S7 can provide the object to the client 302.

Figure 6:
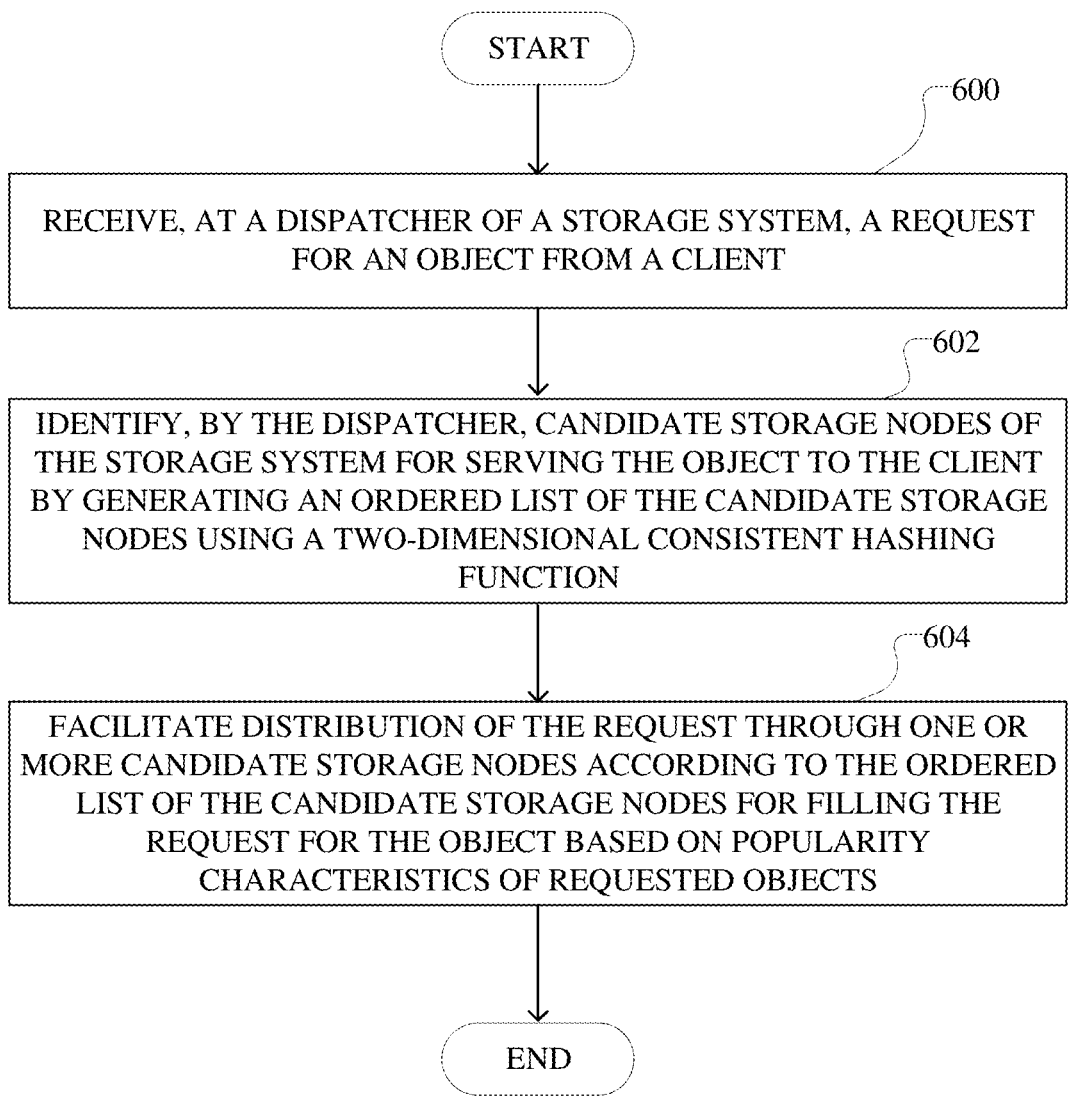
FIG. 6 illustrates a flowchart for an example method of controlling object replication based on popularity.

FIG. 6 illustrates a flowchart for an example method of controlling object replication based on popularity. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated. Each module shown in FIG. 6 represents one or more steps, processes, methods or routines in the method.

At step 600, the dispatcher 304 receives a request for an object from the client 302. The dispatcher 304 can be implemented as part of the client 302. Alternatively, the dispatcher 304 can be implemented remote from the client 302, e.g. as a caching server.

At step 602, the dispatcher 304 identifies candidate storage nodes of the storage system for serving the object to the client. Specifically, the dispatcher 304 can identify the candidate storage nodes by generating an ordered list of the candidate storage nodes using a two-dimensional consistent hashing function. More specifically, the dispatcher 304 can vary storage node diversity as input to the two-dimensional consistent hashing function in order to generate the ordered list of the candidate storage nodes.

At step 604, distribution of the request through one or more candidate storage nodes is facilitated according to the ordered list of candidate storage nodes in order to fill the request for the object based on popularity characteristics of the requested object. Specifically, the dispatcher 304 can transmit the request for the object to a first candidate storage node in the list of the candidate storage nodes. Subsequently, the candidate storage nodes, including the first candidate storage node, can transmit the request sequentially according to the ordered list of candidate storage nodes based on whether the candidate storage nodes accept the request. Further, one of the candidate storage nodes, once accepting the request, can copy the object into local storage if the object is absent from local storage, effectively replicating the object within the storage system. Accordingly replication of the object in the storage system can be controlled in a distributed manner across the storage nodes and on a per-node basis.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 625, to the processor 710. The system 700 can include a cache 712 of high-speed memory connected directly with, in close proximity to, or integrated as part of the processor 710. The system 700 can copy data from the memory 715 and/or the storage device 730 to the cache 712 for quick access by the processor 710. In this way, the cache 712 can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    receiving, at a dispatcher of a storage system, a request for an object from a client;
    identifying, by the dispatcher, candidate storage nodes of the storage system for serving the object to the client by generating an ordered list of the candidate storage nodes using a two-dimensional consistent hashing function that depends on both a flow associated with the request for the object and the object itself; and
    facilitating distribution of the request for the object through one or more candidate storage nodes of the candidate storage nodes according to the ordered list of the candidate storage nodes for filling the request for the object, wherein the one or more candidate storage nodes are configured to facilitate the distribution of the request for the object by selectively filling the request for the object to the client using cache admission policies formed based on popularity characteristics of requested objects at the one or more candidate storage nodes and the one or more candidate storage nodes are configured to selectively replicate the object across at least a portion of the candidate storage nodes based on selectively filing the request for the object.

2. The method of claim 1, wherein the dispatcher is configured to facilitate the distribution of the request for the object by transmitting the request for the object to a first candidate storage node in the ordered list of the candidate storage nodes.

3. The method of claim 1, wherein the one or more candidate storage nodes are configured to selectively fill the request for the object by:
- determining, at a candidate storage node of the one or more candidate storage nodes, whether to accept the request for the object using a cache admission policy of the candidate storage node formed based on popularity characteristics of the requested objects, including popularity characteristics of the requested object, at the candidate storage node;
- identifying whether the object is in local storage at the candidate storage node in response to accepting the request for the object at the candidate storage node; and
- serving the object to the client from the local storage at the candidate storage node if it is identified that the object is in the local storage.

4. The method of claim 3, further comprising:
- retrieving, by the candidate storage node, the object from a source storage node if the request for the object is accepted by the candidate storage node and it is identified that the object is absent from the local storage at the candidate storage node; and
- copying the object into the local storage at the candidate storage node to replicate the object at the candidate storage node.

5. The method of claim 3, further comprising updating the cache admission policy at the candidate storage node based on whether the candidate storage node accepts the request for the object.

6. The method of claim 3, further comprising:
- sequentially forwarding, by the candidate storage node, the request for the object to another candidate storage node of the one or more candidate storage nodes if the candidate storage node rejects the request for the object, wherein the another candidate storage node is configured to determine whether to accept the request for the object using a cache admission policy of the another candidate storage node formed based on popularity characteristics of the requested objects, including popularity characteristics of the requested object, at the another candidate storage node.

7. The method of claim 6, wherein the another candidate storage node is a next candidate storage node in relation to the candidate storage node in the ordered list of the candidate storage nodes.

8. The method of claim 1, wherein the cache admission policies are maintained on a per candidate storage node basis at each of the candidate storage nodes based on popularity characteristics of the requested objects at each of the candidate storage nodes.

9. The method of claim 8, wherein the popularity characteristics of the requested objects at each of the candidate storage nodes includes a number of times requests for each of the requested objects are received at each of the candidate storage nodes.

10. The method of claim 1, wherein the two-dimensional consistent hashing function is applied based on varying storage node diversity.

11. The method of claim 1, wherein at a least a portion of the candidate storage nodes are selected with a storage node diversity that weighs load-balancing within the storage system greater than object locality within the storage system.

12. The method of claim 1, wherein at a least a portion of the candidate storage nodes are selected with a storage node diversity that weighs object locality within the storage system greater than load-balancing within the storage system.

13. The method of claim 12, wherein the object is stored in local storage at a last server in the ordered list of the candidate storage nodes.

14. A system comprising:
- one or more processors; and
- at least one computer-readable storage medium having stored therein instructions which, when executed by the one or more processors, cause the one or more processors to perform operations comprising:
  - receiving, at a dispatcher of a storage system, a request for an object from a client;
  - identifying, by the dispatcher, candidate storage nodes of the storage system for serving the object to the client by generating an ordered list of the candidate storage nodes using a two-dimensional consistent hashing function that depends on both a flow associated with the request for the object and the object itself; and
  - facilitating distribution of the request for the object through one or more candidate storage nodes of the candidate storage nodes according to the ordered list of the candidate storage nodes for filling the request for the object, wherein the one or more candidate storage nodes are configured to facilitate the distribution of the request for the object by selectively filling the request for the object to the client using cache admission policies formed based on popularity characteristics of requested objects at the one or more candidate storage nodes and the one or more candidate storage nodes are configured to selectively replicate the object across at least a portion of the candidate storage nodes based on selectively filing the request for the object.

15. The system of claim 14, wherein the one or more candidate storage nodes are configured to selectively fill the request for the object by:
- determining, at a candidate storage node of the one or more candidate storage nodes, whether to accept the request for the object using a cache admission policy of the candidate storage node formed based on popularity characteristics of the requested objects, including popularity characteristics of the requested object, at the candidate storage node;
- identifying whether the object is in local storage at the candidate storage node in response to accepting the request for the object at the candidate storage node; and
- serving the object to the client from the local storage at the candidate storage node if it is identified that the object is in the local storage.

16. The system of claim 15, wherein the instructions which, when executed by the one or more processors, further cause the one or more processors to perform operations comprising:
- retrieving, by the candidate storage node, the object from a source storage node if the request for the object is accepted by the candidate storage node and it is identified that the object is absent from the local storage at the candidate storage node; and
- copying the object into the local storage at the candidate storage node to replicate the object at the candidate storage node.

17. The system of claim 15, wherein the instructions which, when executed by the one or more processors, further cause the one or more processors to perform operations comprising updating the cache admission policy at the candidate storage node based on whether the candidate storage node accepts the request for the object.

18. The system of claim 14, wherein the two-dimensional consistent hashing function is applied based on varying storage node diversity.

19. A non-transitory computer-readable storage medium having stored therein instructions which, when executed by a processor, cause the processor to perform operations comprising:
- receiving, at a dispatcher of a storage system, a request for an object from a client;
- identifying, by the dispatcher, candidate storage nodes of the storage system for serving the object to the client by generating an ordered list of the candidate storage nodes using a two-dimensional consistent hashing function that depends on both a flow associated with the request for the object and the object itself; and
- facilitating distribution of the request for the object through one or more candidate storage nodes of the candidate storage nodes according to the ordered list of the candidate storage nodes for filling the request for the object, wherein the dispatcher is configured to facilitate the distribution of the request for the object by transmitting the request for the object to a first candidate storage node in the ordered list of the candidate storage nodes and the one or more candidate storage nodes are configured to facilitate the distribution of the request for the object by selectively filling the request for the object to the client using cache admission policies formed based on popularity characteristics of requested objects at the one or more candidate storage nodes.

20. The system of claim 14, wherein the dispatcher is configured to facilitate the distribution of the request for the object by transmitting the request for the object to a first candidate storage node in the ordered list of the candidate storage nodes.

* * * * *